Patented Oct. 21, 1924.

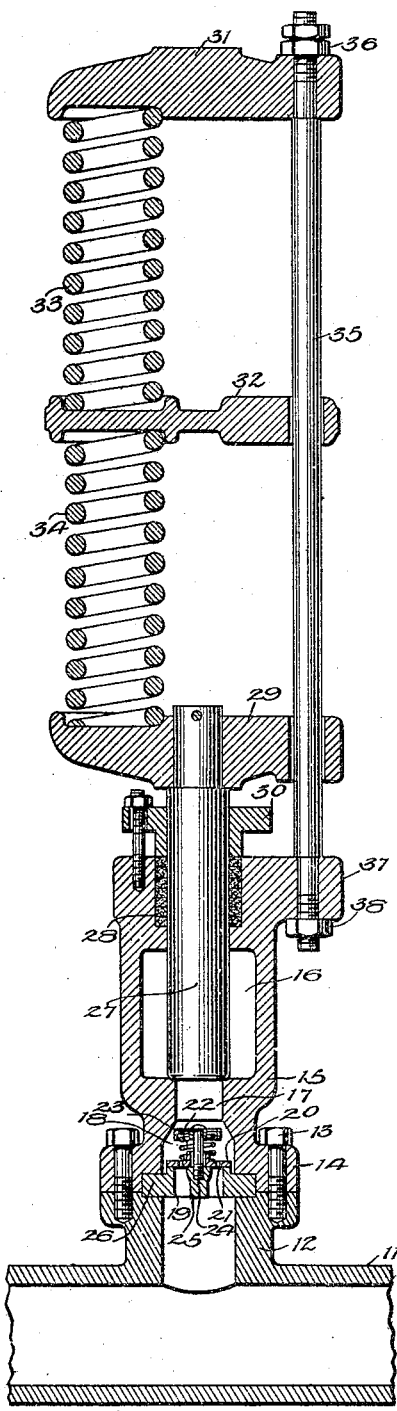

1,512,736

UNITED STATES PATENT OFFICE.

ROSCOE HILTON ALDRICH, OF ALLENTOWN, PENNSYLVANIA.

SHOCK ABSORBER FOR HYDRAULIC SYSTEMS.

Application filed August 15, 1922. Serial No. 582,094.

*To all whom it may concern:*

Be it known that I, ROSCOE H. ALDRICH, a citizen of the United States, and a resident of Allentown, in the county of Lehigh and State of Pennsylvania, have invented a new and Improved Shock Absorber for Hydraulic Systems, of which the following is a full, clear, and exact description.

This invention relates to shock absorbers for hydraulic systems and has for an object to provide an improved construction wherein the shocks of the system may be readily taken up without disturbing the continuous pressure in the system.

Another object of the invention is to provide a shock absorber for taking up shocks in hydraulic systems in which the shocks are absorbed without producing vibration in the liquid.

In the accompanying drawing—

The figure is a longitudinal vertical sectional view through a shock absorber disclosing an embodiment of the invention, the same being shown applied to a pipe line.

Referring to the accompanying drawing by numerals, 11 indicates an ordinary pipe line containing the water or other fluid used in hydraulic systems. In all hydraulic systems, the fluid is forced to the machines to be operated and when these machines are started and stopped, shock takes place and the pressure in the pipe line 11 materially increases. To take care of this shock or increased pressure, the absorber shown in the accompanying drawing is provided. The pipe line 11 is provided with a section 12 flanged for receiving the screws 13 so that the flanged end 14 of the valve casing 15 may be readily bolted in place. The valve casing 15 is provided with a chamber 16 having a discharge opening 17 which discharges into the valve chamber 18 wherein a valve 19 is located through which the water from the pipe 11 must pass when entering chamber 16. The valve 19 may be an ordinary check valve provided with bleeding apertures, the structure shown consisting of a valve plate 20 having several small apertures 21, said plate being held in place by the spring 22 acting against the plate and against a washer 23 maintained in position by a screw 24 threaded into the web 25 of the valve base 26, which valve base is clamped in suitable annular notches formed in the members 12 and 14.

This construction and arrangement of check valve permits the water to freely flow in one direction but will prevent it from flowing in the opposite direction except through the small apertures 21. A plunger 27 normally fits against the outlet 17, said plunger extending through the chamber 16, through a packing box 28 to a suitable point above the casing 15 where it supports a spring seat 29. A gland 30 acts to hold the packing in proper position in the packing box 29. Co-acting with the spring seat 29 is an upper spring seat 31 and a spring plate 32 whereby the respective springs 33 and 34 are accommodated. A tie rod 35 extends loosely through suitable apertures in the seat 29 and plate 32, said rod also having a reduced extension extending through the upper spring seat 31 to which it is clamped by suitable nuts 36. The lower end of the rod 35 is reduced and extends through a flange 37 on the casing 15 to which it is secured by a clamping nut 38.

By this construction and arrangement, whenever a shock occurs in the pipe 11, the water in the pipe will move upwardly through the valve 19 and act on the end of the plunger 27 for raising the same against the action of the springs 33 and 34. This raising movement will be in proportion to the degree of shock and after the shock is over the valve 19 will immediately close so that the water entering the chamber 16 will not be forced immediately back into the pipe and thus produce oscillation or vibration in the system. On the contrary, excess water in the chamber 16 will be gradually forced through the apertures 21 back into the system without producing a shock. If the check valve 19 was not located as disclosed, the springs 33 and 34 would take up the shock originally created but in turn would produce a form of shock by quickly forcing the water back into the system after the first shock had stopped. In fact, there would be a more or less up and down motion of the plunger 27 until an equilibrium was established so that the complete absorption of the shock would not take place immediately. With the use of the check valve 19, the original shock is immediately absorbed and then the water forced into the chamber 16 gradually forced back into the system, and thereby preventing vibration and re-action on the pipe line.

What I claim is:—

1. In a hydraulic system, a pipe for carrying liquid under pressure, a shock absorber in communication with said pipe, said absorber comprising a chamber for receiving the liquid from the said pipe, a spring pressed plunger normally preventing the entrance of the liquid into said chamber, and a check valve between the chamber and pipe and opening toward said chamber, said valve being provided with small openings whereby when a shock occurs in the pipe the valve will be opened and the plunger raised to admit the liquid into said chamber and after the shock is over the excess water in the chamber will be gradually forced back into the pipe.

2. In a hydraulic system, a pipe for carrying a liquid under pressure, a valve casing secured to the pipe and having a liquid receiving chamber and a valve chamber, the valve chamber communicating with the pipe and the liquid receiving chamber, a check valve in the valve chamber and provided with small openings, and a spring pressed plunger working in said liquid receiving chamber and normally closing its communication with the valve chamber.

3. In a hydraulic system, a pipe for carrying a liquid under pressure, a valve casing provided with a liquid receiving chamber and a valve chamber, the valve chamber communicating with the pipe and the liquid chamber, a check valve in the valve chamber and provided with small openings, a plunger working in the liquid receiving chamber and normally closing the communication between it and the valve chamber, an apertured seat at the upper end of the plunger, a rod secured to the valve casing and extending through the aperture of the said seat and provided at its upper end and intermediate its ends with seats, and springs arranged between the said seats.

ROSCOE HILTON ALDRICH.